United States Patent [19]

Knop et al.

[11] Patent Number: 5,360,841
[45] Date of Patent: Nov. 1, 1994

[54] USE OF ETHYLENE OXIDE/PROPYLENE OXIDE BLOCK COPOLYMERS IN HYDRAULIC BINDER MATERIALS AND MATERIALS SO OBTAINED

[75] Inventors: Bernhard Knop, Monheim-Blee; Horst Tamm, Haan; Gerhard Walter, Erkrath, all of Germany

[73] Assignee: Henkel Kommanditgesellschaft auf Aktien, Duesseldorf, Germany

[21] Appl. No.: 778,969

[22] PCT Filed: Jun. 15, 1990

[86] PCT No.: PCT/EP90/00946
§ 371 Date: Dec. 20, 1991
§ 102(e) Date: Dec. 20, 1991

[87] PCT Pub. No.: WO91/00253
PCT Pub. Date: Jan. 10, 1991

[30] Foreign Application Priority Data

Jun. 23, 1989 [DE] Germany .............................. 3920662

[51] Int. Cl.$^5$ ...................... C08K 3/00; G08G 65/32; C08L 71/02
[52] U.S. Cl. ......................................... 524/4; 525/409; 528/393; 528/405; 106/645; 106/654; 106/695
[58] Field of Search ..................... 524/4, 25, 423, 448; 106/695, 654, 645, 670; 525/409; 528/393, 405

[56] References Cited

U.S. PATENT DOCUMENTS 4,263,191  4/1981  Eck et al. ................................ 524/3
4,764,567  8/1988  Ott ........................................ 525/409

FOREIGN PATENT DOCUMENTS 638227  3/1962  Canada ................................ 525/409

*Primary Examiner*—LaVonda DeWitt
*Attorney, Agent, or Firm*—Ernest G. Szoke; Wayne C. Jaeschke; Norvell E. Wisdom, Jr.

[57] ABSTRACT

The addition of ethylene oxide/propylene oxide block copolymers containing 5 to 35 weight % of ethylene oxy groups and molar masses of the propylene glycol block between 1500 and 3000 to dry, hydraulic binder materials results in reduced dust formation, improved wettability, and enhanced flow properties of these materials when they are mixed with water.

20 Claims, No Drawings

USE OF ETHYLENE OXIDE/PROPYLENE OXIDE BLOCK COPOLYMERS IN HYDRAULIC BINDER MATERIALS AND MATERIALS SO OBTAINED

BACKGROUND OF THE INVENTION

1. Field of the Invention

This invention relates to the use of ethylene oxide/propylene oxide block copolymers obtained by addition of ethylene oxide onto polypropylene glycol and having a content of 5 to 35% by weight, based on the total weight of the block copolymers, of ethyleneoxy groups and a number average molecular weight of the polypropylene glycol of 1,500 to 3,000 as an additive for preventing dust emission from dry, hydraulically setting mixtures, more particularly cement-based primers.

In the context of the invention, hydraulically setting mixtures are mixtures, more particularly based on gypsum and/or cement, which are used for building purposes. In the context of the invention, cement-based primers also include levelling, equalizing and repair mixtures. The mixtures in question are fine-particle powders and, in the interests of simplicity, are collectively referred to hereinafter as primers.

2. Statement of Related Art

Primers are used inter alia for the professional preparation of substrates for laying floor coverings. They contain cement, for example Portland cement and/or highalumina cement, gypsum, quartz sand, limestone powder and other inorganic fillers and also inorganic and organic additives, such as cellulose derivatives, redispersion powders, casein, vegetable proteins, more particularly wheat protein, and the like.

Primers are marketed as fine powders which are mixed with water at the building site. Flat, smooth, sufficiently absorbent and firm substrates, for example for floor coverings, can be formed with the water-based mixtures. Stirring of the powders with water is accompanied by serious dust emission. Since cement is a skin irritant on account of its high alkalinity, affecting mucous membrane in particular, such dust emission is undesirable.

The emission of dust from hydraulically setting mixtures, particularly primers, is normally reduced through the degree of grinding or through the particle composition of the powder-form product. However, this adversely affects the processability of relatively coarse powders. Another known method is the aggregation, for example with water, aqueous solutions or dispersions. Thus, it is known from U.S. Pat. No. 4,780,143 that water-based foam can be added to clinker before it is ground to cement in order to reduce dust emission. According to JP-A 63/2847, synthetic resin dispersions are added to cement for air-placed concrete compositions in order to reduce dust emission.

Temporary aggregation in hydraulically setting mixtures is of no significance when the products are to be subsequently ground or used as air-placed concrete or air-placed mortar. However, in fine-particle primers, on which floor coverings are to be laid after application, relatively coarse aggregations are unacceptable because they show up on the surface of many smooth floor covering materials.

It is also known that dust reducing agents can be added to water used to mix cement in order to reduce dust emission during spraying. Thus, JP-A 61/31335 describes mixing water additives, such as polyethylene glycol, for air-placed plaster while JP-A 57/149856 describes polyethylene glycol as an additive for gypsum mixing water to reduce subsequent dust emission during cutting of the gypsum products. JP-A 58/15056 and 59/141448 describe the addition of polyethylene glycol with an average molecular weight of 2000 to dry air-placed concrete mixes for reducing dust emission. Finally, it is mentioned in a company publication (Erbslöh, Düsseldorf) entitled *Das Pluronic-Gitternetz*, Edition IV, that ethylene oxide/propylene oxide block copolymers can be used as a dust-binding agent although there is no reference to the dust-emitting materials suitable for treatment with these mixtures, which encompass a number of products having various contents of ethyleneoxy groups, molecular weights, melting and solidification points and the like.

However, it has been found that polyethylene glycol, glycerol and a large number of the ethylene oxide/propylene oxide block copolymers mentioned in the above-cited company publication *Das Pluronic-Gitternetz* undesirably delay the setting of primers and make the primers hygroscopic, so that they are unsuitable for the application with which the present invention is concerned. If, on the other hand, hydrophobic additives, including a large number of ethylene oxide/propylene oxide block copolymers known from the above cited company publication, are used to reduce dust emission, difficulties arise in regard to the wetting of the powder-form primers.

DESCRIPTION OF THE INVENTION

Summary of the Invention

The present invention is based on the observation that the use of selected ethylene oxide/propylene oxide block copolymers having the above-mentioned contents of ethyleneoxy groups and molecular weights of the polyethylene block lead to an effective reduction in the emission of dust from the powder-form mixtures mentioned above, without adversely affecting important parameters of the cured mixtures, such as compressive strength, tensile strength in bending and shrinkage. At the same time, the stirrability or wettability of the powder-form mixtures with water and also the flow behavior of the powder-form mixtures mixed with water are improved.

The ethylene oxide/propylene oxide block copolymers to be used in accordance with the invention are commercially available mixtures which may be obtained by reaction of polypropylene glycol having the number average molecular weights mentioned above with ethylene oxide and which therefore bear hydrophilic polyoxyethylene groups at both ends of the basically hydrophobic polypropylene glycol molecule.

DESCRIPTION OF PREFERRED EMBODIMENTS

In one preferred embodiment of the invention, the ethylene oxide/propylene oxide block copolymers contain 10 to 30% by weight ethylene oxide groups and the polypropylene glycol block has a number average molecular weight of 1,700 to 2,500.

In another advantageous embodiment of the invention, the ethylene oxide/propylene oxide block copolymers are added to the hydraulically setting mixtures in a quantity of 0.1 to 5% by weight and more particularly in a quantity of 0.3 to 1.5% by weight, based on the total weight of the mixtures.

In another advantageous embodiment, the ethylene oxide/propylene oxide block copolymers have flow points or melting points below 50° C. and, more particularly, below 25° C., because they can then be mixed particularly easily and thoroughly with the fine-particle powders. In addition, the block copolymers may be added during the actual preparation of the powder-form, hydraulically setting mixtures, for example by injection, spraying, with or without pressure and the like. If they are liquid at ambient temperature, as is preferably the case, there is no need to heat them before mixing. At all events, however, it is important to ensure that the block copolymers to be used in accordance with the invention are uniformly mixed with the powder-form mixtures.

It is of particular advantage to use the ethylene oxide/propylene oxide block copolymers mentioned above in hydraulically setting mixtures, particularly primers, having the following composition:

| | |
|---|---|
| 15 to 60 parts by weight | high-alumina cement, |
| 0 to 25 parts by weight | gypsum, more particularly in the form of gypsum semihydrate, |
| 0 to 70 parts by weight | Portland cement, |
| 20 to 80 parts by weight | quartz sand, |
| 0 to 30 parts by weight | fillers, particularly calcium carbonate, |
| 0 to 6 parts by weight | casein and/or vegetable proteins, |
| 0 to 16 parts by weight | redispersion powder and |
| 0 to 3 parts by weight | typical additives, such as plasticizers, accelerators, retarders and/or other auxiliaries. |

The present invention also relates to hydraulically setting mixtures, more particularly cement-based primers, containing ethylene oxide/propylene oxide block copolymers having the features mentioned above. These mixtures are distinguished from mixtures which do not contain the block copolymers in question, above all by the following advantageous properties:
- lower dust emission
- improved wettability
- lower water-cement factor
- better flow behavior of the mixtures mixed with water
- less tension in the cured mixtures and
- standardization of the quality of coatings obtained with the mixtures.

The invention is illustrated by the following Example:

A primer was prepared from the following components:

| | |
|---|---|
| Portland cement 35 F: | 38% by weight |
| High-alumina cement: | 12% by weight |
| Quartz sand (particle size 0 to 0.3 mm): | 30.5% by weight |
| Limestone powder: | 9% by weight |
| Slaked lime: | 6% by weight |
| Casein: | 3.5% by weight |
| Urea: | 0.5% by weight |
| Stucco: | 0.5% by weight |
| Soda: | 0.05% by weight |
| Foam inhibitor: | 0.02% by weight |

These components were mixed in an intensive mixer. The primer obtained was used for comparison purposes.

A primer having the same composition as described above was prepared with incorporation of 1% by weight, based on the total weight of the primer, of an ethylene oxide/propylene oxide block copolymer which had a number average molecular weight of the polypropylene glycol block of about 2,200 and a content of ethyleneoxy groups of about 20% by weight, based on the total weight of the block copolymer, and a flow point of −4° C.

Quantities of 250 g of the above-mentioned primers were mixed with 75 ml water. The dust emitted was measured with a GRAVICON instrument (type VC 25, manufacturer: Ströhlein, Kaarst/Federal Republic of Germany). The measurement showed that dust emission from the primer according to the invention was lower by a factor of 5 than from the comparison product.

The processing properties of the primers produced after mixing with water were determined using a Vicat ring in accordance with DIN 1164 (dimensions of the Vicat ring: height 40 mm, diameter (bottom) 75 mm, diameter (top) 65 mm). The solidification time was substantially the same for both products (comparison product 45 to 75 min, product according to the invention 50 to 85 min).

The slump factor was determined by stirring the primer with the mixing water for 1 minute and introducing the mix into the Vicat ring. After standing for 10 minutes, the ring was withdrawn upwards. 60 seconds after removal of the ring, the diameter of the spreading primer was determined as the slump factor. The slump factor of the comparison product was 20 to 23 cm and was thus lower than that of the product according to the invention which had a slump factor of 21 to 25 cm.

What is claimed is:

1. Hydraulically setting powder-form mixtures, comprising ethylene oxide/propylene oxide block copolymers formed by addition of ethylene oxide onto polypropylene glycol and having a content of 5 to 35% by weight, based on the total weight of the block copolymers, of ethyleneoxy groups and a number average molecular weight of the polypropylene glycol of 1,500 to 3,000, said block copolymers being present in a sufficient amount to reduce dust emission from the powder-form mixtures.

2. Hydraulically setting powder-form mixtures as claimed in claim 1, wherein the ethylene oxide/propylene oxide block copolymers have a content of ethyleneoxy groups of 10 to 30% by weight and a number average molecular weight of the polypropylene block of 1,700 to 2,500.

3. Hydraulically setting powder-form mixtures as claimed in claim 2, wherein the ethylene oxide/propylene oxide block copolymers are present in a quantity of 0.1 to 5% by weight, based on the total weight of the mixtures.

4. Hydraulically setting mixtures as claimed in claim 3, consisting essentially of:

| | |
|---|---|
| 15 to 60 parts by weight | high-alumina cement, |
| 0 to 25 parts by weight | gypsum[, more particularly in the form of gypsum semihydrate], |
| 0 to 70 parts by weight | Portland cement, |
| 20 to 80 parts by weight | quartz sand, |
| 0 to 30 parts by weight | fillers[, particularly calcium carbonate], |
| 0 to 6 parts by weight | casein, [and/or] vegetable proteins, or mixtures thereof, |
| 0 to 16 parts by weight | redispersion powder and |
| 0 to 3 parts by weight | [typical] additives[, such as] selected from the group consisting of plasticizers, |

|  |  |
|---|---|
| 0.1 to 5 % by weight [and, more particularly, 0.3 to 1.5] | accelerators, retarders, [and/or] other auxiliaries, and mixtures thereof and the ethylene oxide/propylene oxide back copolymers. |

5. Hydraulically setting powder-form mixtures as claimed in claim 1 that are cement-based primers.

6. Hydraulically setting powder-form mixtures as claimed in claim 5, wherein the ethylene oxide/propylene oxide block copolymers have a content of ethyleneoxy groups of 10 to 30% by weight and a number average molecular weight of the polypropylene block of 1,700 to 2,500.

7. Hydraulically setting powder-form mixtures as claimed in claim 6, wherein the ethylene oxide/propylene oxide block copolymers are present in a quantity of 0.1 to 5% by weight, based on the total weight of the mixtures.

8. Hydraulically setting powder-form mixtures as claimed in claim 7, wherein the ethylene oxide/propylene oxide block copolymers are present in a quantity of 0.3 to 1.5% by weight, based on the total weight of the mixtures.

9. Hydraulically setting powder-form mixtures as claimed in claim 5, wherein the ethylene oxide/propylene oxide block copolymers are present in a quantity of 0.3 to 5% by weight, based on the total weight of the mixtures.

10. Hydraulically setting powder-form mixtures as claimed in claim 9, wherein the ethylene oxide/propylene oxide block copolymers are present in a quantity of 0.3 to 1.5% by weight, based on the total weight of the mixtures.

11. Hydraulically setting powder-form mixtures as claimed in claim 2, wherein the ethylene oxide/propylene oxide block copolymers are present in a quantity of 0.3 to 1.5% by weight, based on the total weight of the mixtures.

12. Hydraulically setting powder-form mixtures as claimed in claim 1, wherein the ethylene oxide/propylene oxide block copolymers are present in a quantity of 0.1 to 5% by weight, based on the total weight of the mixtures.

13. Hydraulically setting powder-form mixtures as claimed in claim 12, wherein the ethylene oxide/propylene oxide block copolymers are present in a quantity of 0.3 to 1.5% by weight, based on the total weight of the mixtures.

14. Hydraulically setting mixtures as claimed in claim 13, consisting essentially of:

| | |
|---|---|
| 15 to 60 parts by weight | high-alumina cement, |
| 0 to 25 parts by weight | gypsum, |
| 0 to 70 parts by weight | Portland cement, |
| 20 to 80 parts by weight | quartz sand, |
| 0 to 30 parts by weight | fillers, |
| 0 to 6 parts by weight | casein, vegetable proteins, or mixtures thereof, |
| 0 to 16 parts by weight | redispersion powder and |
| 0 to 3 parts by weight | additives selected from the group consisting of plasticizers, accelerators, retarders, other auxiliaries, and mixtures thereof and |
| 0.1 to 5 % by weight of | the ethylene oxide/propylene oxide block copolymers. |

15. Hydraulically setting mixtures as claimed in claim 12, consisting essentially of:

| | |
|---|---|
| 15 to 60 parts by weight | high-alumina cement, |
| 0 to 25 parts by weight | gypsum, |
| 0 to 70 parts by weight | Portland cement, |
| 20 to 80 parts by weight | quartz sand, |
| 0 to 30 parts by weight | fillers, |
| 0 to 6 parts by weight | casein, vegetable proteins, or mixtures thereof, |
| 0 to 16 parts by weight | redispersion powder and |
| 0 to 3 parts by weight | additives selected from the group consisting of plasticizers, accelerators, retarders, other auxiliaries, and mixtures thereof and |
| 0.1 to 5 % by weight of | the ethylene oxide/propylene oxide block copolymers. |

16. Hydraulically setting mixtures as claimed in claim 11, consisting essentially of:

| | |
|---|---|
| 15 to 60 parts by weight | high-alumina cement, |
| 0 to 25 parts by weight | gypsum, |
| 0 to 70 parts by weight | Portland cement, |
| 20 to 80 parts by weight | quartz sand, |
| 0 to 30 parts by weight | fillers, |
| 0 to 6 parts by weight | casein, vegetable proteins, or mixtures thereof, |
| 0 to 16 parts by weight | redispersion powder and |
| 0 to 3 parts by weight | additives selected from the group consisting of plasticizers, accelerators, retarders, other auxiliaries, and mixtures thereof and |
| 0.1 to 5 % by weight of | the ethylene oxide/propylene oxide block copolymers. |

17. Hydraulically setting mixtures as claimed in claim 10, consisting essentially of:

| | |
|---|---|
| 15 to 60 parts by weight | high-alumina cement, |
| 0 to 25 parts by weight | gypsum, |
| 0 to 70 parts by weight | Portland cement, |
| 20 to 80 parts by weight | quartz sand, |
| 0 to 30 parts by weight | fillers, |
| 0 to 6 parts by weight | casein, vegetable proteins, or mixtures thereof, |
| 0 to 16 parts by weight | redispersion powder and |
| 0 to 3 parts by weight | additives selected from the group consisting of plasticizers, accelerators, retarders, other auxiliaries, and mixtures thereof and |
| 0.1 to 5 % by weight of | the ethylene oxide/propylene oxide block copolymers. |

18. Hydraulically setting mixtures as claimed in claim 9, consisting essentially of:

| | |
|---|---|
| 15 to 60 parts by weight | high-alumina cement, |
| 0 to 25 parts by weight | gypsum, |
| 0 to 70 parts by weight | Portland cement, |
| 20 to 80 parts by weight | quartz sand, |
| 0 to 30 parts by weight | fillers, |
| 0 to 6 parts by weight | casein, vegetable proteins, or mixtures thereof, |
| 0 to 16 parts by weight | redispersion powder and |
| 0 to 3 parts by weight | additives selected from the group consisting of plasticizers, accelerators, retarders, other auxiliaries, and mixtures thereof and |
| 0.1 to 5 % by weight of | the ethylene oxide/propylene oxide |

19. Hydraulically setting mixtures as claimed in claim 2, consisting essentially of:

| | |
|---|---|
| 15 to 60 parts by weight | high-alumina cement, |
| 0 to 25 parts by weight | gypsum, |
| 0 to 70 parts by weight | Portland cement, |
| 20 to 80 parts by weight | quartz sand, |
| 0 to 30 parts by weight | fillers, |
| 0 to 6 parts by weight | casein, vegetable proteins, or mixtures thereof, |
| 0 to 16 parts by weight | redispersion powder and |
| 0 to 3 parts by weight | additives selected from the group consisting of plasticizers, accelerators, retarders, other auxiliaries, and mixtures thereof and |
| 0.1 to 5 % by weight of | the ethylene oxide/propylene oxide block copolymers. |

20. Hydraulically setting mixtures as claimed in claim 1, consisting essentially of:

| | |
|---|---|
| 15 to 60 parts by weight | high-alumina cement, |
| 0 to 25 parts by weight | gypsum, |
| 0 to 70 parts by weight | Portland cement, |
| 20 to 80 parts by weight | quartz sand, |
| 0 to 30 parts by weight | fillers, |
| 0 to 6 parts by weight | casein, vegetable proteins, or mixtures thereof, |
| 0 to 16 parts by weight | redispersion powder and |
| 0 to 3 parts by weight | additives selected from the group consisting of plasticizers, accelerators, retarders, other auxiliaries, and mixtures thereof and |
| 0.1 to 5 % by weight of | the ethylene oxide/propylene oxide block copolymers. |

* * * * *

UNITED STATES PATENT AND TRADEMARK OFFICE
CERTIFICATE OF CORRECTION

PATENT NO. : 5,360,841
DATED : November 1, 1994
INVENTOR(S) : Knop et. al.

It is certified that error appears in the above-indentified patent and that said Letters Patent is hereby corrected as shown below:

In claim 4, column 4, starting at approximately line 58, delete all square brackets and all characters contained within the brackets.

In claim 4, column 5, starting at approximately line 2, delete all square brackets and all characters contained within the brackets.

In claim 4, column 5, at approximately line 7, "back", should read:
-- block --.

In claim 9, column 5, line 32, "0.3", should read:
-- 0.1 --.

Signed and Sealed this

Fourth Day of July, 1995

Attest:

BRUCE LEHMAN

Attesting Officer  Commissioner of Patents and Trademarks